(12) United States Patent
Muttik

(10) Patent No.: US 9,843,622 B2
(45) Date of Patent: Dec. 12, 2017

(54) ADAPTIVE AND RECURSIVE FILTERING FOR SAMPLE SUBMISSION

(71) Applicant: Igor Muttik, Hertfordshire (GB)

(72) Inventor: Igor Muttik, Hertfordshire (GB)

(73) Assignee: McAfee, LLC, Santa Clara, CA (US)

( * ) Notice: Subject to any disclaimer, the term of this patent is extended or adjusted under 35 U.S.C. 154(b) by 47 days.

(21) Appl. No.: 14/128,438

(22) PCT Filed: Sep. 24, 2013

(86) PCT No.: PCT/US2013/061388
§ 371 (c)(1),
(2) Date: Dec. 20, 2013

(87) PCT Pub. No.: WO2015/047222
PCT Pub. Date: Apr. 2, 2015

(65) Prior Publication Data
US 2015/0088967 A1     Mar. 26, 2015

(51) Int. Cl.
*H04L 29/08*     (2006.01)
*H04L 29/06*     (2006.01)
(Continued)

(52) U.S. Cl.
CPC .............. *H04L 67/10* (2013.01); *G06F 21/55* (2013.01); *G06F 21/564* (2013.01);
(Continued)

(58) Field of Classification Search
CPC . H04L 67/10; H04L 63/1416; H04L 63/0263; G06F 61/50
(Continued)

(56) References Cited

U.S. PATENT DOCUMENTS

| 7,543,068 B2 * | 6/2009 | Aaron ............... G06F 17/30699 709/203 |
| 8,230,510 B1 * | 7/2012 | Yang et al. .................... 726/24 |

(Continued)

FOREIGN PATENT DOCUMENTS

WO    WO 2013137917 A1 * 9/2013

OTHER PUBLICATIONS

International Search Report and Written Opinion regarding corresponding PCT Application No. PCT/US2013/061388, dated Jun. 13, 2014.

*Primary Examiner* — Brian J Gillis
*Assistant Examiner* — Steve Lin
(74) *Attorney, Agent, or Firm* — Blank Rome, LLP

(57) ABSTRACT

Disclosed are systems, apparatuses, computer readable media, and methods of using an adaptive (i.e., learning) client-server system to enhance the efficiency of sample submissions, e.g., the submission of samples of malware programs to a server dictionary. The server in such a system may accumulate a dictionary of known programs and/or portions of programs that have been submitted by many different client devices over time, representing all the various programs that they have encountered. If a portion of a particular file submission is already "available" to the server (i.e., it is a portion that the server has already analyzed and stored), it will be excluded from all future sample transmissions. The server will gradually accumulate a rich dictionary of common program portions, thus requesting transmission only of previously unseen portions. Such systems, apparatuses, computer readable media, and methods may therefore be used to reduce transmission times needed for future sample submissions.

22 Claims, 7 Drawing Sheets

(51) Int. Cl.
  *G06F 21/55* (2013.01)
  *G06F 21/56* (2013.01)
  *H04L 9/32* (2006.01)

(52) U.S. Cl.
  CPC ...... *H04L 63/0263* (2013.01); *H04L 63/1416* (2013.01); *H04L 9/3239* (2013.01); *H04L 63/145* (2013.01)

(58) Field of Classification Search
  USPC ........................................................ 790/203
  See application file for complete search history.

(56) References Cited

U.S. PATENT DOCUMENTS

| | | | |
|---|---|---|---|
| 8,645,333 B2* | 2/2014 | Balachandran ....... | G06F 12/023 707/692 |
| 8,676,759 B1* | 3/2014 | Zhu et al. ..................... | 707/638 |
| 8,925,085 B2* | 12/2014 | Johnson et al. ............... | 726/23 |
| 2005/0071766 A1* | 3/2005 | Brill et al. ..................... | 715/738 |
| 2006/0075502 A1* | 4/2006 | Edwards ................ | G06F 21/56 726/24 |
| 2007/0240222 A1* | 10/2007 | Tuvell et al. ................... | 726/24 |
| 2008/0126523 A1* | 5/2008 | Tantrum et al. ............... | 709/223 |
| 2008/0282020 A1 | 11/2008 | Burgess et al. | |
| 2010/0154063 A1* | 6/2010 | Hutton et al. .................. | 726/24 |
| 2010/0242094 A1* | 9/2010 | Hussain et al. .................. | 726/4 |
| 2011/0041179 A1* | 2/2011 | St Hlberg ....................... | 726/23 |
| 2011/0066805 A1 | 3/2011 | Janschitz et al. | |
| 2011/0214184 A1* | 9/2011 | Whitehouse et al. .......... | 726/24 |
| 2011/0302654 A1* | 12/2011 | Miettinen ............. | G06F 21/566 726/23 |
| 2012/0011101 A1* | 1/2012 | Fang ....................... | H04L 63/12 707/654 |
| 2012/0173656 A1* | 7/2012 | Sorenson, III .... | G06F 17/30156 709/217 |
| 2013/0042083 A1 | 2/2013 | Mutalik et al. | |
| 2013/0111591 A1* | 5/2013 | Topan ................... | G06F 21/563 726/24 |
| 2013/0138775 A1* | 5/2013 | Shah ............................. | 709/219 |
| 2014/0068768 A1* | 3/2014 | Lospinuso ............ | G06F 21/562 726/23 |
| 2014/0358858 A1* | 12/2014 | Camble et al. ............... | 707/634 |
| 2016/0127398 A1* | 5/2016 | Cohen .................. | H04L 9/3231 726/23 |

* cited by examiner

ADAPTIVE AND RECURSIVE FILTERING FOR SAMPLE SUBMISSION

TECHNICAL FIELD

This disclosure relates generally to systems, apparatuses, methods, and computer readable media for optimizing sample submissions in client mobile and embedded devices. More particularly, but not by way of limitation, this disclosure relates to systems, apparatuses, methods, and computer readable media to permit client mobile devices, e.g., smart phones, tablets, ultrabooks, and the like, which may frequently suffer from intermittent Internet connectivity, e.g., as their owners move around between access points, to submit to a server for inspection only those portions of samples that are not currently known to a server dictionary.

BACKGROUND

To analyze a program and determine its malicious or benign nature, it is necessary to obtain a copy (i.e., a sample) of the program. This is often a problem, even on established platforms (like Windows) due to the large (and growing) size of software (both clean and dirty). It can be an even bigger problem for mobile or embedded devices that have limited resources (e.g., CPU, battery, bandwidth), intermittent connectivity, and also where lengthy transmissions can hurt user experience and/or cause increased carrier costs for the user.

There are currently documented solutions to submit "slices" of programs from multiple devices (e.g., in a peer-to-peer (P2P) fashion) to a server dictionary for analysis, but they only work if a program is sufficiently common so that the "submission load" can be distributed between multiple clients.

With the proliferation of targeted malware (and, more generally, with the scale of attacks shrinking, where fewer targets are affected by the same piece of malware), there is an increasing need to submit unique samples in full and quickly while minimizing the bandwidth consumption.

Submitting an entire sample in full from a mobile device with intermittent connectivity (or from an embedded device over a temporary link, e.g., in a "data milling" scenario) may often be problematic. For example, disconnection in the middle of a transmission (e.g., when the data mule leaves the range of the access point) may end up invalidating the entire sample submission. Thus, it would be valuable to have a more efficient scheme for submitting sample information for analysis at a server site.

The subject matter of the present disclosure is directed to overcoming, or at least reducing the effects of, one or more of the problems set forth above. To address these and other issues, techniques that, in part, use adaptive and/or recursive filters to intelligently determine portions of samples to send to a server for analysis are described herein.

DETAILED DESCRIPTION

Disclosed are systems, apparatuses, computer readable media, and methods of using an adaptive (i.e., learning) client-server system to enhance the efficiency of sample submissions, e.g., the submission of samples of malware programs to a server dictionary. The server in such a system may accumulate a dictionary of known programs and/or portions of programs that have been submitted by many different client devices over time, representing all the various programs that they have encountered. If a portion of a particular file submission is already "available" to the server (i.e., it is a portion that the server has already analyzed and stored), it will be excluded from all future sample transmissions. The server will gradually accumulate a rich dictionary of common program portions, thus requesting transmission only of previously unseen portions. Such systems, apparatuses, computer readable media, and methods may therefore be used to reduce transmission times needed for future sample submissions. With reference to the figures, embodiments of sample submission optimization schemes according to this disclosure are provided below.

Figure 1:
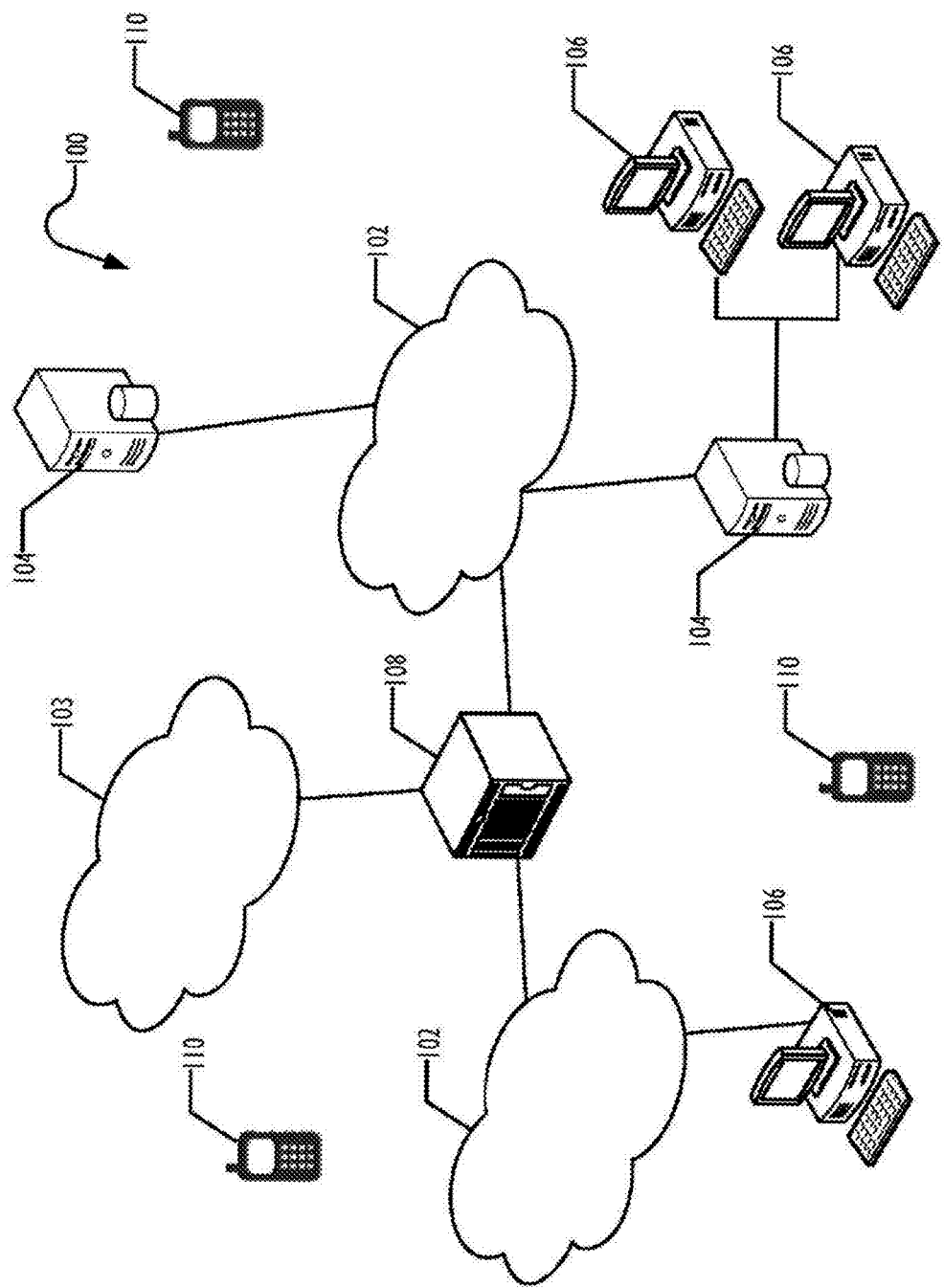
FIG. 1 is a block diagram illustrating network architecture infrastructure 100 according to one or more disclosed embodiments.

Referring now to FIG. 1, infrastructure 100 is shown schematically. Infrastructure 100 contains computer networks 102. Computer networks 102 include many different types of computer networks available today, such as the Internet, a corporate network, or a Local Area Network (LAN). Each of these networks can contain wired or wireless devices and operate using any number of network protocols (e.g., TCP/IP). Networks 102 are connected to gateways and routers (represented by 108), end user computers 106 and computer servers 104. Also shown in infrastructure 100 is cellular network 103 for use with mobile communication devices: As is known in the art, mobile cellular networks support mobile phones and many other types of devices (e.g., tablet computers not shown). Mobile devices in the infrastructure 100 are illustrated as mobile phones 110.

In a network such as that displayed in FIG. 1, adaptive and recursive sample filtering software may be deployed to manage and control sample submissions between client and server devices on the network. This software could be used to, e.g., split sample programs into portions, create hashes of such portions, and send such hashes to a server dictionary to determine whether the portion is already known and/or available to the server. If a sample is split to the smallest allowed portion size and is still unavailable and/or unknown to the server, then such portion may be sent in ball to the server for analysis and logging. As noted above, such devices may frequently come into and out of communication with computer networks 102 as the devices and/or user's carrying such devices move around, thus it may be important to streamline the amount of data that needs to be sent from any particular mobile device 110. Mobile devices 110 are example of client devices that may attempt to adaptively and recursively submit samples for submission, e.g., to a server computer 104 having a program dictionary of potentially harmful program and file components, as will be described further below.

Figure 2A:
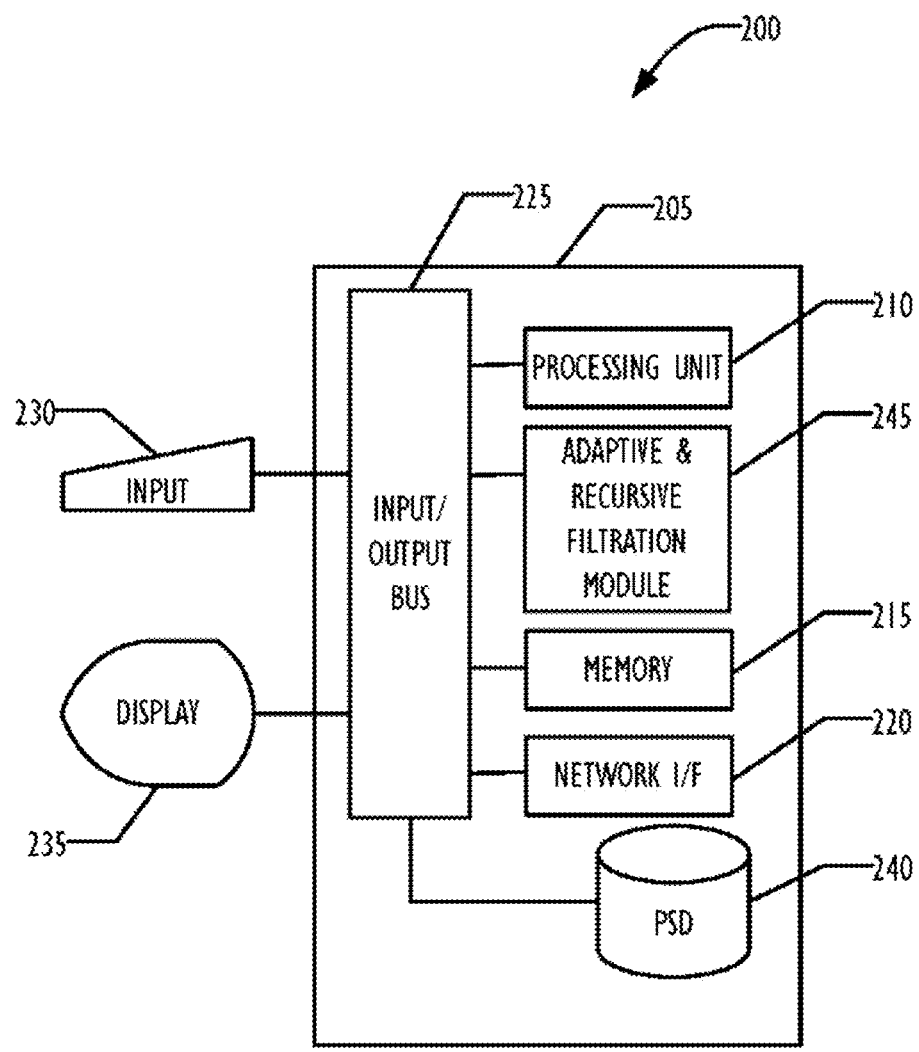
FIG. 2A is a block diagram illustrating a computer which could be used to execute the communication optimization approaches described herein according to one or more of disclosed embodiments.

Referring now to FIG. 2A, an example processing device 200 for use in providing communication optimization techniques according to one embodiment is illustrated in block diagram form. Processing device 200 may serve as processor in a mobile phone 110, gateway or router 108, client computer 106, or a server computer 104. Example processing device 200 comprises a system unit 205 which may be optionally connected to an input device for system 230 (e.g., keyboard, mouse, touch screen, etc.) and display 235. A program storage device (PSD) 240 (sometimes referred to as a hard disk, flash memory, or non-transitory computer readable medium) is included with the system unit 205. Also included with system unit 205 is a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state, storage elements, including removable media, and may be included within system unit 205 or be external to system unit 205. Program storage device 240 may be used for storage of software to control system unit 205 data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, and INTEL® CORE™ processor families from Intel Corporation and the Cortex and ARM processor families from ARM. (INTEL, INTEL ATOM, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include an adaptive and recursive filtration module 245, which may be implemented in firmware to aid in the performance of the sample submission optimization techniques described herein.

Figure 2B:
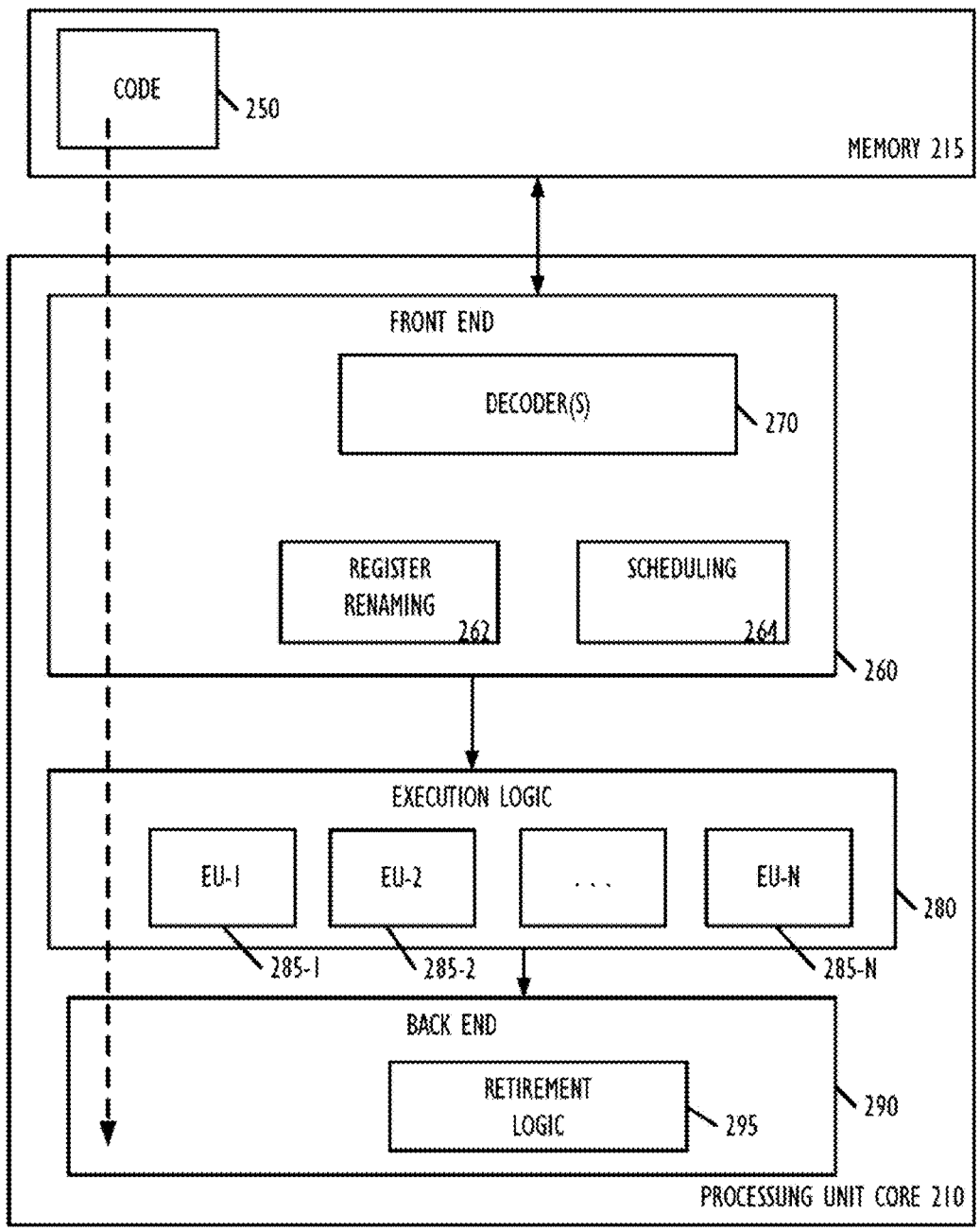
FIG. 2B is a block diagram illustrating a processor core, which may reside on a computer according to one or more of disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy), as are known or otherwise available to those of skill in the art. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms as known to those of skill in the art (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

Adaptive and Recursive Sample Submission Filter

According to one embodiment, a scheme for adaptive and recursive filtering for sample submission could operate in accordance with the following generalized steps: (1) A client device receives a new program and submits a full hash of the program to the server. (2) If the sample is known and available at the server, the sample submission process on the client may stop operations, since there is nothing thither to analyze. (3) If the entire sample is not known to the server, the client may then attempt to split the program into portions recursively, according to a set of rules that may be pre-shared with the server (if the rules determine that no further splitting is required, then the recursive program splitting is stopped). (4) The client may then submit hashes and fingerprints (i.e., hashes of filtered versions of the program portions) of all identified portions to the server. (5) The server may then reply with an identification of which portions are already known and available to the server and, thus, which may be omitted in the transmission. (6) The client may then submit to the server only the portions previously unknown to the server. (7) The client software may then further split (i.e., recursively) the unknown portions by returning to step (3) above. [Note that step (7) is optional, as the rules in step (3) may determine that further splitting is not required or allowed.] The server may then reconstruct the original sample by merging the new portions submitted by the client and previously-known portions kept in the server's dictionary. Finally, the server may perform the desired analysis (which may include any combination of manual or automatic methods like static and dynamic analysis, including, but not limited to, decompilation, reverse engineering, data-flow analysis, and call-graph analysis, as well as any kind of supervised or unsupervised machine learning, clustering, etc.) on the original sample, e.g., a malware detection process. While the embodiment described above contemplates sending all the hashes to the server and then all the unknown portions, other embodiments may also send the hashes and unknown portions in a serial fashion, hash—portion—hash—portion, etc.

To better understand the adaptive and recursive filtering process, one may consider the example of the submission of a paragraph of text. For example, the process may begin by identifying a hash for the entire paragraph that will uniquely identify the text. If the particular paragraph of text is not known to the server, it may be split into sentences, which may then be hashed individually. If, again, the sentences' hashes are not known to the server, the sentences may be split into individual words and the individual words may be hashed. In this example, the hashes of all individual words would be known by the server because they would be stored in, e.g., a server-side hash dictionary. Thus, the 'individual word'-level would be the point at which the recursion would stop in this example regarding a paragraph of text. As will be appreciated, different implementations could define different 'base case' safeguards into the recursion process, so that, when the process has divided the program into the smallest allowable portion, it will not attempt to split the program any further.

Another example of the adaptive and recursive filtering process can be a decomposition of an Android APK installation package for an app. APK packages are bundles of compressed files in ZIP format, and may contain sub-files (such as resources, metadata information, and the program in 'classes.dex'). The process may submit a hash of the entire APK, and if there is no dictionary match on the server, it can submit hashes of all sub-files. For any APK which is not built from scratch as a new project, some sub-files from the APK would be likely known to the server (e.g., icons of various sizes from resources folders that are shared with the previous version of the same app, images and animations, strings from menu items, developer certificates, etc.)

Filtering

To create a "fingerprint," a filter can be applied to a portion of sample (e.g., a filter that makes the code/data position-independent). The filter may be platform-dependent, e.g., on an x86 CPU, references to absolute memory addresses in the code can be replaced with sequential numbers—or even zeroes—to create a position-independent portion. Such filtering will also help compress the data better. Thus, the sample that is reconstituted on the server side may not be identical to the original sample—but it can still be sufficiently similar for certain types of analysis (e.g., if only the object code is submitted, it can still be decompiled; alternatively, data without code may still carry suspicious. URLs or exploit data blocks that are sufficient for sample classification). The level of filtering to be applied may also depend on the client parameters (connectivity type, e.g., 3G/4G, bandwidth availability, and/or average duration of connection). Filtering may also involve discarding certain parts of the portions (e.g., removing blocks of zeroes, spaces, data-fill blocks, repeated patterns, inactive/dead code branches, etc.) or converting/replacing them (e.g., performing lower case to upper case characters conversion, or any other kind of table-driven or algorithmic conversion) before computing their hashes and sending them as fingerprints.

The server may then replace these "filtered" portions when fill "unfiltered" binary portions are submitted. This can improve the server representation of a sample even for unique samples (e.g., when portions are discovered in other software programs that match original hashes—a scenario that is entirely possible for unique, targeted malware samples coming from the same source, wherein different binaries may share their portions due, for example, to code/data "cut and pasting" or common libraries). The server may analyze the new portions, determine the best method of further splitting them into portions, and send the client (or multiple clients) the updated splitting rules.

To better understand the filtering process, one may consider the example of a color image file. In the case of a color image file, the filtering could comprise removing all coloring, converting the image into a black and white image. Then, if the fingerprint of a black and white image matches the fingerprint of a filtered color sample image file known to the server, there is a very strong likelihood that the incoming file is the same as the matched sample image file located on the server. This type of filtering technique may also be resilient to minor differences between image files. For example, if hashes match for images on the client and on the server after applying noise-reduction (or reducing the detail) on either or both sides, then the images are guaranteed to be similar.

In the case of text string, one type of filter that might be used would be a 'lowercase' filter. Such a filter can correct for differences in capitalization between otherwise identical strings, so that strings of varying capitalizations (but the same letters) would still match the same text on the backend server.

Another example of programs where the techniques described herein may be useful is large programming libraries, e.g., standard C libraries. With the application of a certain level of filtering, e.g., the removal of all elements related to positioning in the program, all instances of a given library will be recognized as instances of the same library. Such instances may then be reconstructed at the server, if necessary, and would not need to be submitted to the server in their entireties by the client devices.

Sample Splitting According to Pre-Shared Rules

Figure 3:
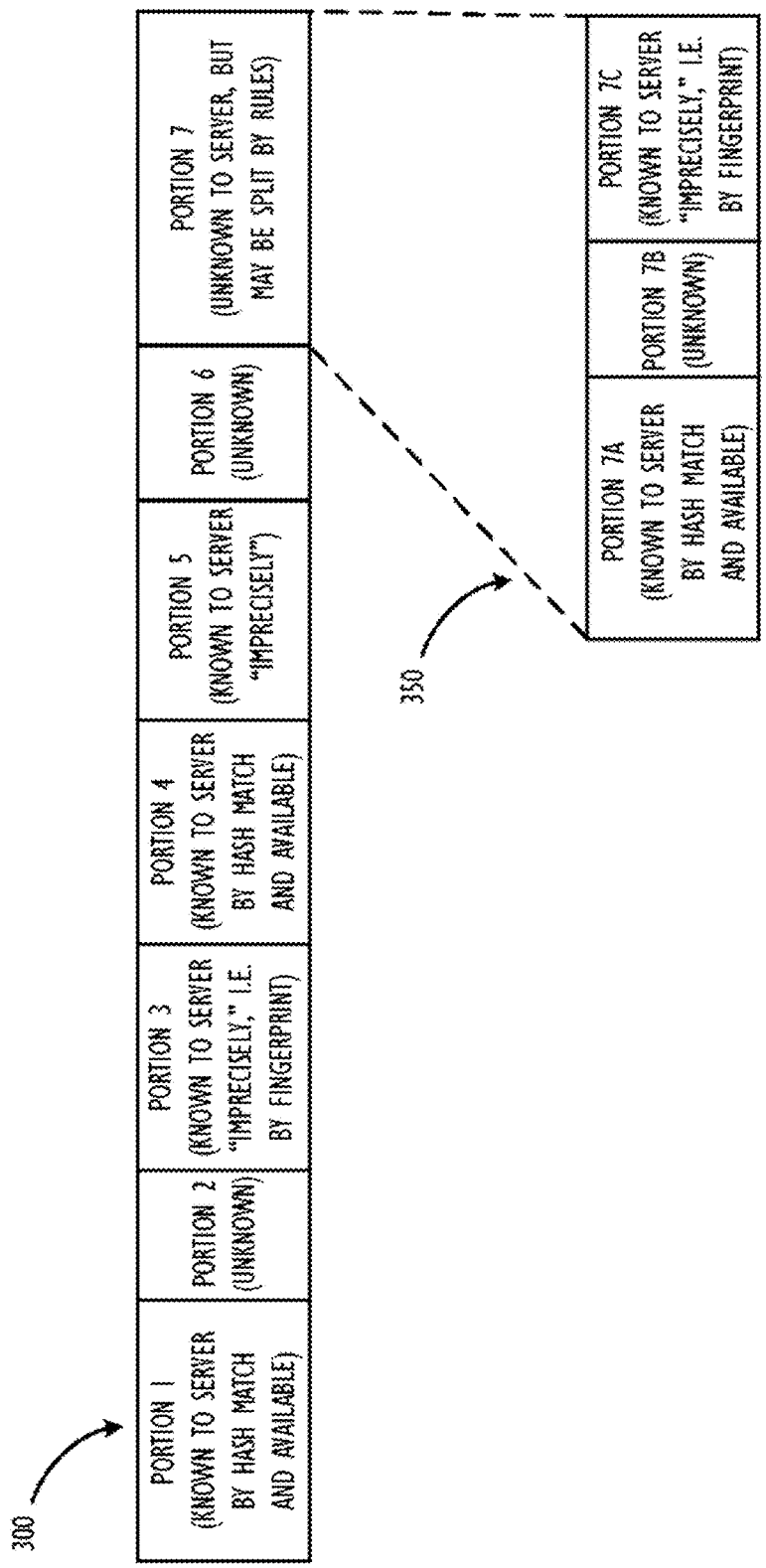
FIG. 3 shows a symbolic representation of splitting a sample according to pre-shared rules for submission to a server dictionary, according to one or more disclosed embodiments.

Referring now to FIG. 3, a symbolic representation of splitting a sample 300 according to pre-Shared rules for submission to a server dictionary is shown, according to one or more disclosed embodiments. Sample 300 is shown as consisting of seven individual portions, at least after a first pass of recursive sample splitting. In particular, Portion 1 is described as being known to the server by a hash match and available at the server dictionary. When a particular portion of a sample is known and available to the server, there is no further need to submit this portion of the sample to the server, and the process may proceed to the next portion of the sample. In the example of sample 300, Portion 2 is described as being unknown to the server. In this example, the splitting rules do not provide for any other way for Portion 2 to be further split. Therefore, this portion of the sample should be sent to the server for analysis, if the connection allows. Moving on to Portion 3, this portion is known to the server "imprecisely," that is, it is known via a fingerprint. In other words, the exact code block that is stored in Portion 3 may not be known to the server letter-for-letter, but, once the appropriate filtering has been applied to the code block (e.g., the position-independent code filtering described above) and the filtered portion has been hashed, the sample is now recognized by the server. Thus, Portion 3 would only need to be sent to the server if the connection time available allows for it.

Moving on to Portion 4, this portion is again described as being known to the server via a hash match and available, and thus does not need to be re-sent to the server. Portion 5 is also described as being known "imprecisely" to the server, that is, the server does not have an exact match, but when irrelevant information (for the purposes of sample analysis) is stripped from the portion, the server is able to recognize the portion, and thus it does not need to be sent unless the connection time available allows for it. Portion 6, like Portion 2, is described as being unknown to the server and not able to be further split. Thus, Portion 6 is a good candidate to be sent to the server for analysis. Finally, Portion 7 is unknown to the server, but may be split into further sub-portions, according to the pre-shared rules. In this case, Portion 7 may be split 350 into sub-portions 7A, 7B, and 7C.

At this point, the filtration process and sample portion submission process may be executed recursively on the sub-portions 7A, 7B, and 7C. As shown in the example of FIG. 3, sub-portion 7A is known to the server by hash match and is available at the server dictionary, and, thus, does not need to be re-submitted. Portion 7B is described as being unknown to the server and not able to be further split. Thus, Portion 7B is a good candidate to be sent to the server for analysis. Finally, Portion 7C is known to the server "imprecisely," that is, it is known via a fingerprint. Thus, Portion 7C would only need to be sent to the server if the connection time available allows for it.

To summarize, only previously-unknown Portions 2, 6, and 7B would be sent to the server in the example shown in FIG. 3. Portions 3 and 7C may also be sent if the connection allows for it. The server will then be able to reconstitute the entire sample 300, since it would already have all the other portions available to it (or at least other samples to pull those portions from).

Figure 4A:
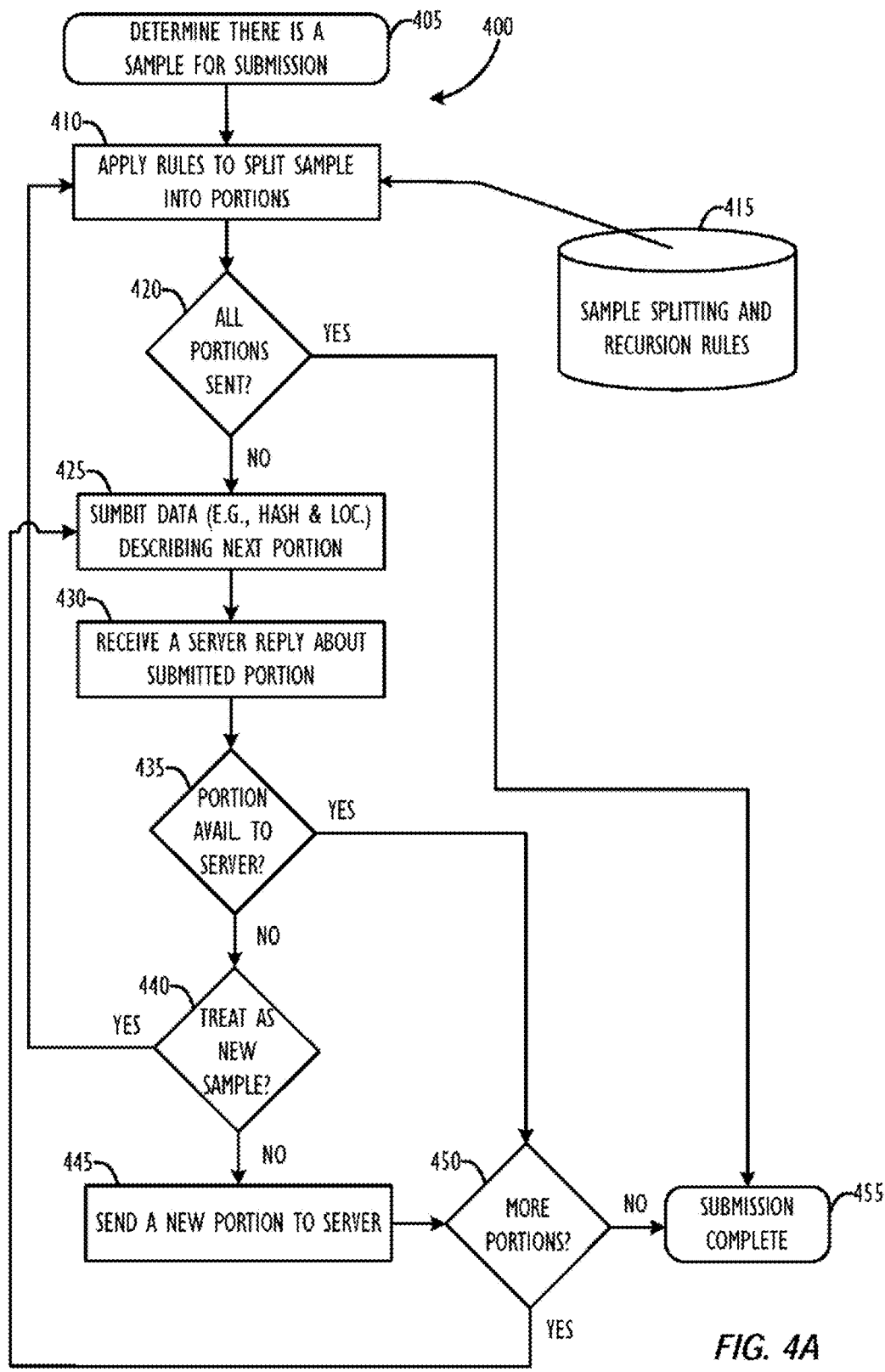
FIG. 4A is a flowchart of one embodiment of a method for adaptively and recursively filtering portions of samples at a client for submission to a server dictionary.

FIG. 4A shows a flowchart 400 illustrating one embodiment of a method for adaptively and recursively filtering portions of samples at a client for submission to a server dictionary, wherein data is sent to the server in an alternating, i.e., "hash"—"portion"—"hash"—"portion" format, as will be described below. First, the client may determine that there is a sample in need of submission (405). Next, the client may apply a set of pre-shared (e.g., pre-shared from the sample submission server) rules to the sample data to split the sample into portions (410). In doing so, the client may consult a set of pre-shared sample splitting and recursion rules 415.

Next, the client may determine if all necessary portions have been sent to the server (420). If the answer is 'YES' at block 420, the submission is complete (455), and the process for this particular sample is terminated. If, instead, the answer is 'NO' at block 420, then the client may submit data describing the next portion of the sample to the server (425). In some embodiments, the data describing the particular portion may be a hash of the portion that may be used to uniquely identify the content of the particular portion and the location of the particular portion relative to the beginning of the sample. After analysis of the hash by the server, the client may receive a reply from the server regarding whether or not the particular portion is known to the server (430). The server may then recompose the sample from portions which may initially create a "sparse" view of the sample. If portions are sent sequentially and their size is communicated to the server, then the server can compute the locations without explicit positions (i.e., offsets from the beginning of the sample) being sent. When further portions arrive e.g., from one or more clients) the server's view may become less sparse and eventually turn into a genuine representation of the sample.

If, at block 435, the client receives an indication that the portion is already available to the server, the process may skip over submitting that portion and proceed to block 450 to determine if there are any further sample portions for potential submission to the server. If there are not further portions, the submission is complete (455), and the process for this particular sample (or a recursion step) is terminated. If, instead, there are further portions at block 450, the process may return to block 425 to submit data describing the next portion for submission to the server.

If, instead, at block 435, the client receives an indication that the portion is not already available to the server, the process may proceed to block 440 to receive a determination of whether or not the portion should be treated as a new sample. If the portion should be treated as its own sample ('YES's at block 440), then the process may proceed to recursively call the sample analysis process on the newly-determined "sub-sample" by returning to block 410. Examples of treating a portion as a new sample could be finding an APK object as a sub-file inside a parent APK package or finding a Flash object embedded inside a Linux ELF binary. If instead, the portion should not be treated as its own sample ('NO' at block 440), the process may proceed to send the current sample portion to the server for further analysis (445) and then proceed to block 450 to analyze the next portion, if any, of the original sample.

Figure 4B:
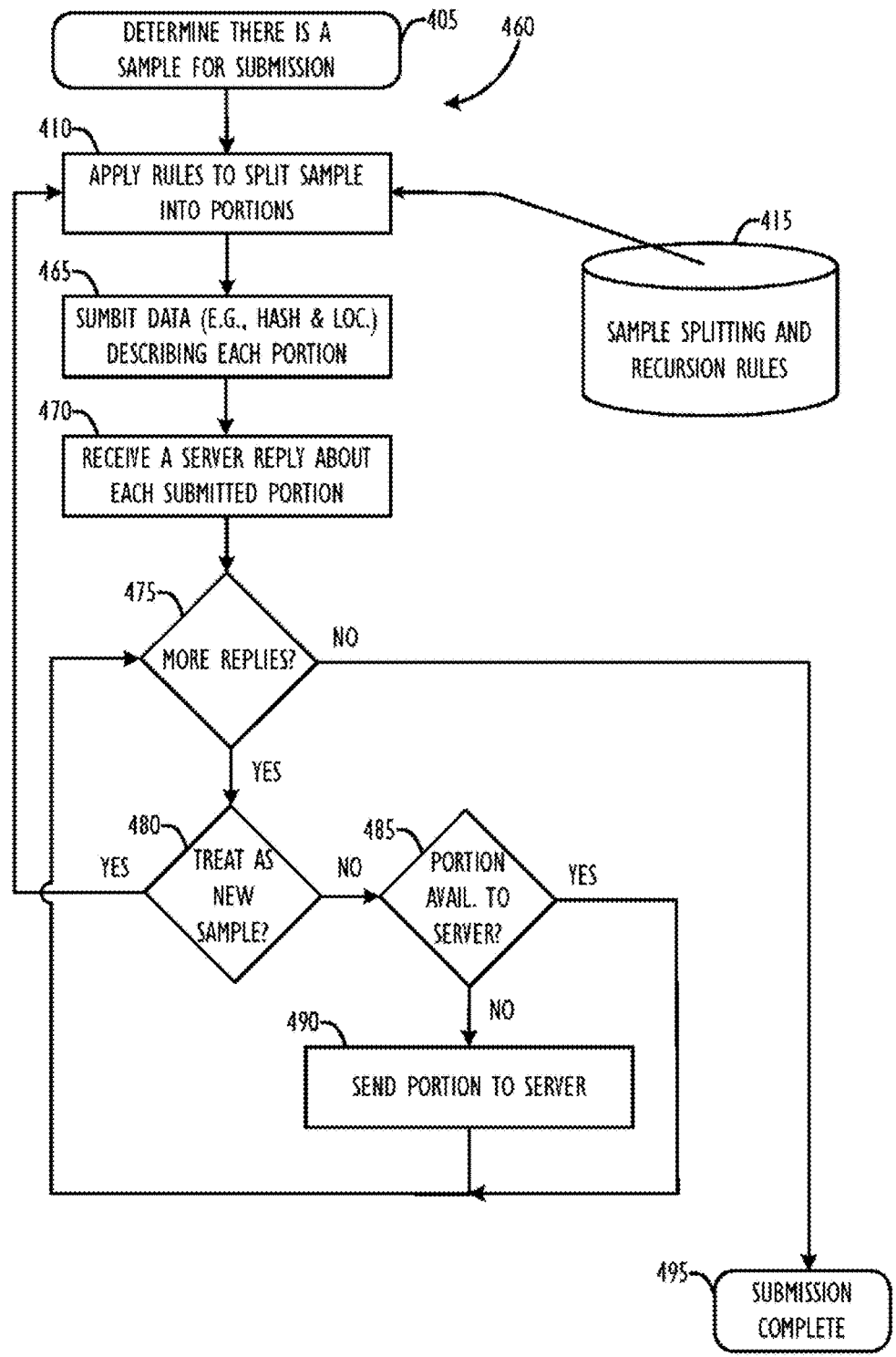
FIG. 4B is a flowchart of one embodiment of another method for adaptively and recursively filtering portions of samples at a client for submission to a server dictionary.

FIG. 4B shows a flowchart 460 illustrating another embodiment of a method for adaptively and recursively filtering portions of samples at a client for submission to a server dictionary, wherein data is sent to the server in an "all hashes"—"all necessary portions" format, as will be described below. Illustrative method embodiment 460 begins similarly to embodiment 400. In other words, first, the client may determine that there is a sample in need of submission, which may involve asking the server whether it is already in the dictionary (405). Next, the client may apply a set of pre-shared (e.g., pre-shared from the sample submission sewer) rules to the sample data to split the sample into portions (410). In doing so, the client may consult as set of pre-shared sample splitting and recursion rules 415.

However, in embodiment 460 the client may next submit data (e.g., a hash and a location relative to the beginning of the sample) describing each portion of the sample being submitted to the server (465) (as opposed to sending just the data related to the first portion, as is shown in block 425 of embodiment 400 in FIG. 4A). Next, the client may receive a server reply about each portion to be submitted, i.e., whether the portion should be treated as a known portion, a new portion, or a new sample (470).

Next, the client may determine if there are any further replies from the server that need to be handled (475). If the answer is 'NO' at block 475, the submission is complete (495), and the process for this particular sample is terminated. If, instead, the answer is 'YES' at block 475, then the client may receive a determination of whether or not the portion should be treated as a new sample. If the portion should be treated as its own sample ('YES' at block 480), then the process may proceed to recursively call the sample analysis process on the newly-determined "sub-sample" by returning to block 410. If instead, the portion should not be treated as its own sample ('NO' at block 480), the process may proceed to receive a determination of whether the current portion is known to the server (485).

If the answer is 'YES' at block 485, i.e., the sample portion is already available to the server, then the process may proceed to block 475 to analyze the next reply regarding a portion from the sample. If, instead, the answer is 'NO' at block 485, the process may send the current sample portion to the server for analysis (490) and then return to block 475 to take necessary action on the next reply, if any additional replies remain.

Figure 5:
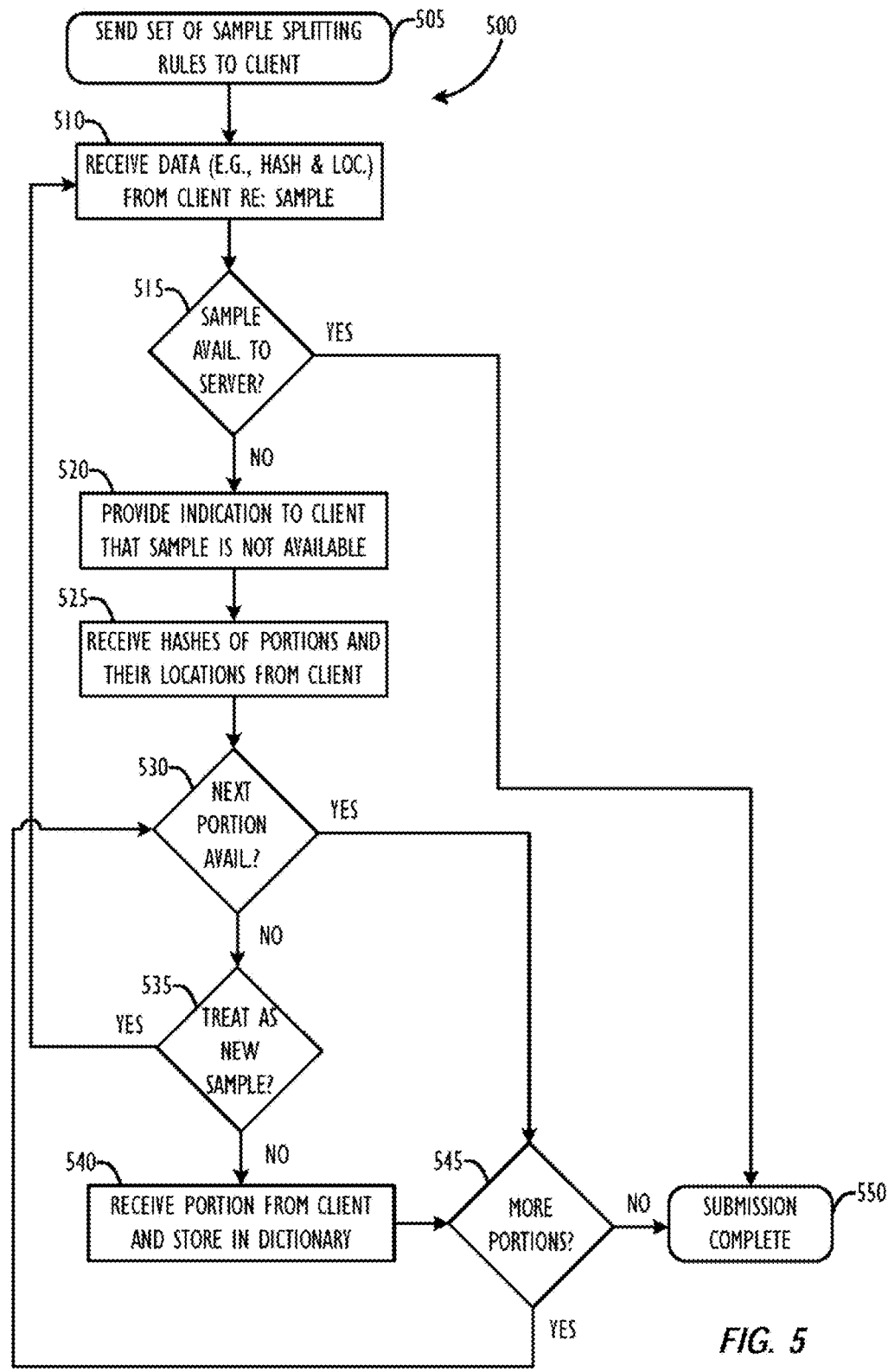
FIG. 5 is a flowchart of one embodiment of a method for receiving adaptively and recursively filtered portions of samples from a client for analysis at a server.

Referring now to FIG. 5, a flowchart of one embodiment of a method for receiving adaptively and recursively filtered portions of samples from a client for analysis at a server is shown from the perspective of the server. First, the server may send a set of sample splitting rules to one or more clients (505). This set of rules may be created manually or automatically from the set of portions kept in the server's dictionary. By analyzing features extracted from the portions' dictionary (e.g., periodically) via standard machine-learning methods, the system may build a set of clustering rules which would provide better coverage of the original samples. If so, this new set of rules may be shared with the clients, thus making the system 'adaptive.' Next, the server may receive the first data (e.g., a hash and corresponding location information with respect to the beginning of the sample) from a client regarding a sample for potential submission (510). Next, the server may determine whether or not the sample is available to the server, i.e., whether the hash is known to the server and/or the sample is in the server dictionary (515). If the answer is 'YES' at block 515, the submission is complete (550), and the process for this particular sample is terminated. If, instead, the answer is 'NO' at block 515, then the server may provide an indication to the client that the sample is not available at the server (520). The server may then receive the hashes and corresponding locations of the various portions making up the sample from the client (525). (Note that, while this example describes all the hashes as being sent, followed by all the needed portions, other embodiments may employ the "hash—portion hash—portion" approach described above.) If the first portion received is available at the server ('YES' at block 530), then the process may proceed to determine whether there are further portions being sent from the client to inspect (545). If the answer is 'NO' at block 545, the submission is complete (550), and the process for this particular sample is terminated. If, instead, the answer is 'YES' at block 545, then the process will return to block 530 to determine if the next portion received is available at the server.

Returning to block 530, if the portion received is not available at the server (i.e., 'NO' at block 530), the server will analyze the portion to determine whether it should be treated as a new sample. If the portion is to be treated as a new sample ('YES' at block 535), the process may return to block (510) and begin the sample receiving process again with the newly-identified sample. If, instead the portion is not to be treated as a new sample ('NO' at: block 535), the server may receive the portion from the client and store it in the appropriate location in the server dictionary (540). The process may then proceed to block 545 to determine if there are further portions being sent from the client(s) for analysis, and continue performing the operations described above until there are no further portions for server analysis.

EXAMPLES

The following examples pertain to further embodiments. Example 1 is a non-transitory computer readable medium comprises computer executable instructions stored thereon to cause one or more processing units to: identify a sample for submission to a server; receive an indication from the server whether sample is available to the server; and if the indication is that the sample is not available to the server: split the sample into a plurality of portions according to a set of rules; create hashes of each of the plurality of portions; submit the hashes of each of the plurality of portions and their respective locations to the server; receive an indication from the server whether each of the plurality of portions is available to the server; and submit to the server only those portions wherein the server indicated that the portion is not known to the server.

Example 2 includes the subject matter of example 1, wherein at least one of the submitted portions comprises a filtered portion.

Example 3 includes the subject matter of example 1 or 2, wherein, if the indication is that the sample is available to the server, no portion of the sample is submitted to the server.

Example 4 includes the subject matter of example 1 or 2, wherein the set of rules comprises a set of rules that has been pre-shared from the server.

Example 5 includes the subject matter of example 1 or 2, wherein at least one of the plurality of portions comprises a library file.

Example 6 includes the subject matter of example 1, wherein, if the indication is that one of the portions of the plurality of portions is not available to the server, the instructions further cause the one or more processing units to recursively split the one portion into a plurality of sub-portions according to the set of rules.

Example 7 includes the subject matter of example 6, wherein the instructions further cause the one or more processing units to continue recursively splitting portions into a plurality of sub-portions according to the set of rules until either: receiving an indication from the server that a sub-portion is known to the server; or the set of rules determines that no further splitting is required.

Example 8 includes the subject matter of example 1, wherein the instructions to identify a sample for submission to a server comprise instructions to identify a sample for malware analysis.

Example 9 includes the subject matter of example 2, further comprising instructions to create fingerprints of each of the plurality of portions.

Example 10 includes the subject matter of example 9, further comprising instructions to submit the fingerprints of each of the plurality of portions to the server.

Example 11 is a non-transitory computer readable medium comprises computer executable instructions stored thereon to cause one or more processing units to: send a set of sample splitting rules to a client; receive a hash of a sample from the client; determine whether the sample is available to a dictionary communicatively coupled to the one or more processing units; provide an indication to the client whether the sample is available; and if the indication is that the sample is not available: receive a plurality of hashes of portions of the sample and their respective locations from the client, wherein the portions have been created by splitting the sample according to the set of rules; determine whether each of the plurality of portions is available to the dictionary; provide an indication to the client whether each of the plurality of portions is available to the dictionary; receive from the client only those portions wherein the portion is not available to the dictionary: and storing the received portions in the dictionary.

Example 12 includes the subject matter of example 11, further comprising instructions to cause the one or more processing units to reconstruct the sample by merging the received portions and the portions already available to the dictionary.

Example 13 includes the subject matter of example 12, further comprising instructions to cause the one or more processing units to perform malware analysis on the sample.

Example 14 includes the subject matter of example 11, wherein at least one of received portions comprises a filtered portion.

Example 15 includes the subject matter of example 14, further comprising instructions to cause the one or more processing units to replace at least one of the filtered portions with an unfiltered version of the portion.

Example 16 includes the subject matter of example 11, further comprising instructions stored thereon to cause one or more processing units to: analyze the received portions; determine an updated set of sample splitting rules based, at least in part, on the analysis of the received portions; and send the updated set of sample splitting rules to the client.

Example 17 is a method of sample analysis, comprising: sending a set of sample splitting rules from a server to a client; receiving at the server a hash of a sample from the client; determining at the server whether the sample is available to a dictionary communicatively coupled to the server; providing by the server an indication to the client whether the sample is available to the server; and if the indication is that the sample is not available: receiving at the server a plurality of hashes of portions of the sample and their respective locations from the client, wherein the portions have been created by splitting the sample according to the set of rules; determining at the server whether each of the plurality of portions is available to the dictionary; providing by the server an indication to the client whether each of the plurality of portions is available to the dictionary; receiving at the server only those portions wherein the portion is not available to the dictionary; and storing the received portions in the dictionary.

Example 18 includes the subject matter of example 17, further comprising the act of reconstructing the sample by merging the received portions and the portions already available to the dictionary at the server.

Example 19 includes the subject matter of example 17, further comprising, the act of performing malware analysis on the sample at the server.

Example 20 includes the subject matter of example 17, wherein at least one of the received portions comprises a filtered portion.

Example 21 includes the subject matter of example 20, further comprising the act of replacing at the server at least one of the filtered portions with an unfiltered version of the portion.

Example 22 includes the subject matter of example 17, further comprising the acts of analyzing the received portions at the server; determining an updated set of sample splitting rules based, at least in part, on the analysis of the received portions; and sending the updated set of sample splitting rules to the client.

Example 23 is an apparatus configured to perform sample analysis, comprising: a memory; and one or more processing units, communicatively coupled to the memory, wherein the memory stores instructions to configure the one or more processing units to: identify a sample for submission to a server; create a hash of the sample; submit the hash of the sample to the server; receive an indication from the server whether the sample is available to the server; and if the indication is that the sample is not available to the server: split the sample into a plurality of portions according to a set of rules; create hashes of each of the plurality of portions; submit the hashes of each of the plurality of portions and their respective locations to the server; receive an indication from the server whether each of the plurality of portions is available to the server; and submit to the server only those portions wherein the server indicated that the portion is not available to the server.

Example 24 includes the subject matter of example 23, wherein, if the indication is that one of the portions of the plurality of portions is not available to the server, the instructions further cause the one or more processing units to recursively split the one portion into a plurality of sub-portions according to the set of rules.

Example 25 includes the subject matter of example 23, wherein the instructions to identify a sample for submission to a server comprise instructions to identify a sample for malware analysis.

Example 26 is an apparatus configured to perform sample analysis, comprising: memory means; and processing means, communicatively coupled to the memory means, wherein the memory means stores instructions to configure the processing means to: identify a sample for submission to a server; create a hash of the sample; submit the hash of the sample to the server; receive an indication from the server whether the sample is available to the server; and if the indication is that the sample is not available to the server: split the sample into a plurality of portions according to a set of rules; create hashes of each of the plurality of portions; submit the hashes of each of the plurality of portions and their respective locations to the server; receive an indication from the server whether each of the plurality of portions is available to the server; and submit to the server only those portions wherein the server indicated that the portion is not available to the server.

Example 27 includes the subject matter of example 26, wherein, if the indication is that one of the portions of the plurality of portions is not available to the server, the instructions further cause the processing means to recursively split the one portion into a plurality of sub-portions according, to the set of rules.

Example 28 includes the subject matter of example 26, wherein the instructions to identify a sample for submission to a server comprise instructions to identify a sample for malware analysis.

Example 29 is an apparatus, comprising: a memory; one or more processing units; and a non-transitory computer readable medium comprising computer executable instructions stored thereon to cause the one or more processing units to: identify a sample for submission to a server; receive an indication from the server whether sample is available to the server; and if the indication is that the sample is not available to the server: split the sample into a plurality of portions according to a set of rules; create hashes of each of the plurality of portions: submit the hashes of each of the plurality of portions and their respective locations to the server; receive an indication from the server whether each of the plurality of portions is available to the server; and submit to the server only those portions wherein the server indicated that the portion is not known to the server.

Example 30 includes the subject matter of example 29, wherein at least one of the submitted portions comprises a filtered portion.

Example 31 includes the subject matter of example 29, wherein, if the indication is that the sample is available to the server, no portion of the sample is submitted to the server.

Example 32 includes the subject matter of example 29, wherein the set of rules comprises a set of rules that has been pre-shared from the server.

Example 33 includes the subject matter of example 29, wherein at least one of the plurality of portions comprises a library file.

Example 34 includes the subject matter of example 29, wherein, if the indication is that one of the portions of the plurality of portions is not available to the server the instructions further cause the one or more processing units to recursively split the one portion into a plurality of sub-portions according to the set of rules.

Example 35 includes the subject matter of example 34, wherein the instructions further cause the one or more processing units to continue recursively splitting portions into a plurality of sub-portions according to the set of rules until either: receiving an indication from the server that a sub-portion is known to the server; or the set of rules determines that no further splitting is required.

Example 36 includes the subject matter of example 29, wherein the instructions to identify a sample for submission to a server comprise instructions to identify a sample for malware analysis.

Example 37 includes the subject matter of example 30, further comprising instructions to create fingerprints of each of the plurality of portions.

Example 38 includes the subject matter of example 37, further comprising instructions to submit the fingerprints of each of the plurality of portions to the server.

Example 39 is an apparatus, comprising: a memory; one or more processing units; and a non-transitory computer readable medium comprising computer executable instructions stored thereon to cause the one or more processing units to: send a set of sample splitting rules to a client; receive a hash of a sample from the client; determine whether the sample is available to a dictionary communicatively coupled to the one or more processing units; provide an indication to the client whether the sample is available; and if the indication is that the sample is not available: receive a plurality of hashes of portions of the sample and their respective locations from the client, wherein the portions have been created by splitting the sample according to the set of rules; determine whether each of the plurality of portions is available to the dictionary; provide an indication to the client whether each of the plurality of portions is available to the dictionary; receive from the client only those portions wherein the portion is not available to the dictionary; and storing the received portions in the dictionary.

Example 40 includes the subject matter of example 39, further comprising instructions to cause the one or more processing units to reconstruct the sample by merging the received portions and the portions already available to the dictionary.

Example 41 includes the subject matter of example 39, further comprising instructions to cause the one or more processing units to perform malware analysis on the sample.

Example 42 includes the subject matter of example 39, wherein at least one of the received portions comprises a filtered portion.

Example 43 includes the subject matter of example 42, further comprising instructions to cause the one or more processing units to replace at least one of the filtered portions with an unfiltered version of the portion.

Example 44 includes the subject matter of example 39, further comprising instructions to cause the one or more processing units to: analyze the received portions; determine an updated set of sample splitting rules based, at least in part, on the analysis of the received portions; and send the updated set of sample splitting rules to the client.

Example 45 is a machine readable medium including code, when executed, to cause a machine to perform the method of any one of examples 17-22.

In the foregoing description, for purposes of explanation, numerous specific details are set forth in order to provide a thorough understanding of the disclosed embodiments. It will be apparent, however, to one skilled in the art that the disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein." "wherein."

What is claimed is:

1. A non-transitory computer readable medium comprising computer executable instructions stored thereon to cause one or more processing units to:
   identify a sample for submission to a server, wherein the server is configured to perform malware analysis on the submitted sample;
   receive an indication from the server whether the sample is available to the server; and
   if the indication is that the sample is not available to the server:
      split the sample into a plurality of portions according to a set of rules;
      filter the plurality of portions, wherein the instructions to filter comprise instructions to discard at least a part of the respective portions;

create hashes of each of the plurality of filtered portions, wherein each respective filtered portion comprises parts of the portion that were not discarded by the filtering, and wherein each of the created hashes comprises a fingerprint;

submit the fingerprints of each of the plurality of filtered portions, along with their respective locations relative to a beginning of the sample, to the server;

receive an indication from the server whether each of the plurality of portions is available to the server; and submit to the server only those filtered portions wherein the server indicated that the portion is not available to the server, wherein each submitted filtered portion remains sufficiently similar to the respective portion before filtering, allowing the server to perform the malware analysis.

2. The non-transitory computer readable medium of claim 1, wherein at least one of the submitted filtered portions has had at least one of the following parts discarded: a block of zeroes; spaces; data-fill blocks; repeated patterns; inactive code branches; and dead code branches.

3. The non-transitory computer readable medium of claim 1, wherein, if the indication is that the sample is available to the server, no portion of the sample is submitted to the server.

4. The non-transitory computer readable medium of claim 1, wherein the set of rules comprises a set of rules that has been pre-shared from the server.

5. The non-transitory computer readable medium of claim 1, wherein at least one of the plurality of portions comprises a library file.

6. The non-transitory computer readable medium of claim 1, wherein, if the indication is that one of the portions of the plurality of portions is not available to the server, the instructions further cause the one or more processing units to recursively split the one portion into a plurality of sub-portions according to the set of rules.

7. The non-transitory computer readable medium of claim 6, wherein the instructions further cause the one or more processing units to continue recursively splitting portions into a plurality of sub-portions according to the set of rules until either: receiving an indication from the server that a sub-portion is available to the server; or the set of rules determines that no further splitting is required.

8. The non-transitory computer readable medium of claim 1, wherein the instructions to identify a sample for submission to a server comprise instructions to identify a sample for malware analysis.

9. A non-transitory computer readable medium comprising computer executable instructions stored thereon to cause one or more processing units to:

send a set of sample splitting rules to a client;
receive a hash of a sample from the client;
determine whether the sample is available to a dictionary communicatively coupled to the one or more processing units;
provide an indication to the client whether the sample is available; and
if the indication is that the sample is not available:
  receive, from the client, a plurality of hashes of filtered portions of the sample, along with their respective locations relative to a beginning of the sample,
  wherein the filtered portions of the sample have been created by splitting the sample according to the set of rules,
  wherein the filtered portions of the sample comprise portions of the sample that remain after at least a part of the portion of the sample has been discarded,
  wherein each filtered portion remains sufficiently similar to the respective portion before filtering, allowing the malware analysis to be performed, and
  wherein each of the plurality of hashes of filtered portions comprises a fingerprint;
  determine whether each of a plurality of portions corresponding to the received plurality of hashes of filtered portions is available to the dictionary;
  provide an indication to the client whether each of the plurality of portions is available to the dictionary;
  receive, from the client, filtered versions of only those portions wherein the portion is not available to the dictionary;
  store the received filtered portions in the dictionary; and
  perform malware analysis on the sample.

10. The non-transitory computer readable medium of claim 9, further comprising instructions to cause the one or more processing units to reconstruct the sample by merging the received filtered portions and the portions already available to the dictionary.

11. The non-transitory computer readable medium of claim 9, wherein at least one of the received filtered portions has had at least one of the following parts discarded: a block of zeroes; spaces; data-fill blocks; repeated patterns; inactive code branches; and dead code branches.

12. The non-transitory computer readable medium of claim 9, further comprising instructions to cause the one or more processing units to replace at least one of the received filtered portions with an unfiltered version of the portion.

13. The non-transitory computer readable medium of claim 9, further comprising instructions stored thereon to cause one or more processing units to:
analyze the received filtered portions;
determine an updated set of sample splitting rules based, at least in part, on the analysis of the received portions; and
send the updated set of sample splitting rules to the client.

14. A method of sample analysis, comprising:
sending a set of sample splitting rules from a server to a client;
receiving at the server a hash of a sample from the client;
determining at the server whether the sample is available to a dictionary communicatively coupled to the server;
providing by the server an indication to the client whether the sample is available to the server; and
if the indication is that the sample is not available:
  receiving, at the server, a plurality of hashes of filtered portions of the sample, along with their respective locations relative to a beginning of the sample,
  wherein the filtered portions of the sample have been created by splitting the sample according to the set of rules,
  wherein the filtered portions comprise portions of the sample that remain after at least a part of the portion of the sample has been discarded,
  wherein each filtered portion remains sufficiently similar to the respective portion before filtering, allowing the server to perform the malware analysis, and
  wherein each of the plurality of hashes of filtered portions comprises a fingerprint;

determining at the server whether each of a plurality of portions corresponding to the received plurality of hashes of filtered portions is available to the dictionary;

providing, by the server, an indication to the client whether each of the plurality of portions is available to the dictionary;

receiving, at the server, filtered versions of only those portions wherein the portion is not available to the dictionary;

storing the received filtered portions in the dictionary; and performing malware analysis on the sample.

15. The method of claim 14, further comprising the act of reconstructing the sample by merging the received portions and the portions already available to the dictionary at the server.

16. The method of claim 14, wherein the act of performing malware analysis on the sample is performed at the server.

17. The method of claim 14, wherein at least one of the received filtered portions has had at least one of the following parts discarded: a block of zeroes; spaces; data-fill blocks; repeated patterns; inactive code branches; and dead code branches.

18. The method of claim 14, further comprising the act of replacing at the server at least one of the received filtered portions with an unfiltered version of the portion.

19. The method of claim 14, further comprising the acts of:

analyzing the received portions at the server;

determining an updated set of sample splitting rules based, at least in part, on the analysis of the received portions; and sending the updated set of sample splitting rules to the client.

20. An apparatus configured to perform sample analysis, comprising:

a memory; and one or more processing units, communicatively coupled to the memory, wherein the memory stores instructions to configure the one or more processing units to:

identify a sample for submission to a server, wherein the server is configured to perform malware analysis on the submitted sample;

filter the sample, wherein the instructions to filter comprise instructions to discard at least a part of the sample;

create a hash of the filtered sample;

submit the hash of the filtered sample to the server;

receive an indication from the server whether the filtered sample is available to the server; and if the indication is that the filtered sample is not available to the server:

split the sample into a plurality of portions according to a set of rules;

filter the plurality of portions, wherein the instructions to filter the plurality of portions comprise instructions to discard at least a part of the respective portions;

create hashes of each of the filtered plurality of portions, wherein each respective filtered portion comprises parts of the portion that were not discarded by the filtering, and wherein each of the created hashes comprises a fingerprint;

submit the fingerprints of each of the filtered plurality of portions, along with their respective locations relative to a beginning of the sample, to the server;

receive an indication from the server whether each of the plurality of portions is available to the server; and submit to the server only those portions wherein the server indicated that the portion is not available to the server, wherein each submitted filtered portion remains sufficiently similar to the respective portion before filtering, allowing the server to perform the malware analysis.

21. The apparatus of claim 20, wherein, if the indication is that one of the portions of the plurality of portions is not available to the server, the instructions further cause the one or more processing units to recursively split the one portion into a plurality of sub-portions according to the set of rules.

22. The apparatus of claim 20, wherein the instructions to identify a sample for submission to a server comprise instructions to identify a sample for malware analysis.

* * * * *